United States Patent
Desbiens

(10) Patent No.: US 7,141,325 B2
(45) Date of Patent: Nov. 28, 2006

(54) INTEGRATED FUEL CELL POWER CONDITIONING WITH ADDED FUNCTIONAL CONTROL

(75) Inventor: Donald J. Desbiens, Yarmouth, ME (US)

(73) Assignee: Fairchild Semiconductor Corporation, Portland, ME (US)

( * ) Notice: Subject to any disclaimer, the term of this patent is extended or adjusted under 35 U.S.C. 154(b) by 383 days.

(21) Appl. No.: 10/729,626

(22) Filed: Dec. 5, 2003

(65) Prior Publication Data

US 2004/0214060 A1    Oct. 28, 2004

Related U.S. Application Data

(60) Provisional application No. 60/431,513, filed on Dec. 6, 2002.

(51) Int. Cl.
*H01M 8/04* (2006.01)
*H01M 8/00* (2006.01)

(52) U.S. Cl. .......................... 429/23; 429/24; 429/22; 429/12

(58) Field of Classification Search .................. 429/12, 429/22, 23, 24, 25
See application file for complete search history.

(56) References Cited

U.S. PATENT DOCUMENTS 6,312,846 B1    11/2001    Marsh .......................... 429/30
6,387,556 B1    5/2002    Fuglevand et al. ........... 429/22
2003/0170515 A1    9/2003    Wang et al.

OTHER PUBLICATIONS

"Micro-Fuel Cells Could Revolutionize Cars, Computers", in Environmental News Service, May 1, 2000.
International Search Report for Related PCT Application No. PCT/US03/38112.

*Primary Examiner*—Patrick Joseph Ryan
*Assistant Examiner*—Thomas H. Parsons
(74) *Attorney, Agent, or Firm*—Cesari and McKenna, LLP; Edwin H. Paul, Esq.

(57) ABSTRACT

A power system with a fuel cell array is integrated with power, conversion and control circuitry forming an assembly on a single chip. The power system may include mounted discrete components or flip chips. The power transistors may be built with contacts on both top and bottom of the chip, where the large area on the bottom allows for high power dissipation and current densities. Electrical connections are made between the components by etched runs or integrated layers, as is typically found in integrated circuits. The control functions include controlling the gas flowing in the fuel cell channels in response to the power supplied. Temperature and pressure may be measured and used to optimize the power system operation.

7 Claims, 3 Drawing Sheets

INTEGRATED FUEL CELL POWER CONDITIONING WITH ADDED FUNCTIONAL CONTROL

CROSS-REFERENCE TO RELATED APPLICATIONS

The present application claims the benefit of U.S. Provisional Patent Application Ser. No. 60/431,513, which was filed on Dec. 6, 2002. This provisional application is of common ownership and inventorship with the present application, and which provisional application is hereby incorporated herein by reference.

BACKGROUND OF THE INVENTION

1. Field of the Invention

The present invention relates to fuel cell power systems and more particularly to MEMS (microelectronic mechanical systems) based fuel cell structures on the chip with integrated functional power conditioning circuitry for converting, conditioning and regulating the output power.

2. Background Information

As personal portable computer electronics become smaller and smaller, there is a need to power the electronics with batteries or battery equivalents (i.e. fuel cells) which provide higher power densities.

Fuel cells and their control have been developed for many years. One such example is found in U.S. Pat. No. 6,387,556 that describes a fuel cell power system including a controller that monitors and controls the fuel cell operation. This patent is incorporated herein by reference.

Microelectronic mechanical systems (MEMS) have progressed to forming chanels and membranes for implementing fuel cells at the chip level. An example is found in U.S. Pat. No. 6,312,846, by Marsh. This patent discloses fuel cell structures formed on the same wafer (the large substrate upon which many individual integrated circuit chips are formed). Typically the individual chips are cut out from to wafer and packaged individually. However, Marsh shows different functional circuits formed on different chips where the different chips remain on the same wafer. Interconnections then may be made by discrete wiring or deposition between the chips. These chips provide functions that include power conversion, conditioning and regulation. Power conversion, conditioning and regulation are used redundantly herein and in the art where the terms "conditioning," "conversion," and "regulation" may each include or exclude the other two depending on context.

One limitation of the Marsh technology is that practical implementations will be large since large sections of the wafer must be used, and wafers may be four, eight, or more inches in diameter. These large sections include spacing between the different chips where interconnections must run to make electrical connections. These interconnections require additional steps and associated costs.

The prior art as evidenced by the above referenced U.S. patents describe how to fabricate fuel cell structures as described at the chip level. It is well known to use separate electronics packages to provide the conversion, regulating and conditioning functions, where the separate packages are electrically interconnected using cables or soldered wires.

However, there is a continuing need to reduce the size, while providing higher power densities, of power systems for use in portable and the ever smaller computers and recreational and business electronics. Consistent with these needs, an objective of the present invention is to utilize a variety of electronic devices including switched mode or linear power supply circuitry for providing practical fuel cell power supplies in small packages with high power capabilities.

SUMMARY OF THE INVENTION

In view of the foregoing background discussion, the present invention provides an integrated power system including a fuel cell array integrated with power converting, conditioning and regulating control all constructed on a single chip. A fuel cell or an array of fuel cells provides a first voltage output at electrical contact points. The fuel cell or cells have channels and membranes as known in the art, where gases flow in the channels on either side of the membranes and produces a first output voltage at the contacts. A power converter system, preferably using a switching mode type circuitry as known in the art, accepts the first output voltage and converts and conditions it to produce a second output voltage suitable for powering electrical systems, especially electronic, computer and/or communications systems. Conditioning may include, inter alia, active or passive filtering.

A controller for the fuel cells regulates the gases flowing into the fuel cell channels. The gas flow corresponds to a power output at the first output voltage. Circuitry is provided that detects the power demanded at the second output voltage and provides a feedback signal to the fuel cell controller. The fuel cell controller responds to meet the required output power at the second output voltage.

In one preferred embodiment, the integrated power system provides embedded-temperature and pressure sensors of the gases in or near to the gas flow channels. The temperature and pressure are fed to the controller and used to optimize the system performance. Prior to using this scheme, the system performance as a function of the temperature and pressure may be measured and profiled, as known to those practitioners in the art, and used by the controllers to optimize performance.

The power transistors are integrated on the chip, and in a preferred embodiment, interconnections to these power components are made by etched runs on the top of the chip. The top being the side of the chip where typical diffusions and material growth occurs in integrated circuit fabrication. In another preferred embodiment the power transistors are formed through the chip to the substrate side. In this configuration the high current density and power points on the transistors are available on the bottom or substrate side of the chip. This allows better heat sinking and larger electrical connections to be made on this side of the chip.

In yet another preferred embodiment, parts of the power converting, conditioning and controlling functions are constructed on a separate assembly or separate integrated circuit which also has first electrical contact points. The integrated power system is then configured with electrical contact points corresponding the first electrical contact points, such that the at least one assembly can be mounted onto the chip and electrical connections made between the chip and the separate assembly or integrated circuit without using additional discrete electrical wires.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
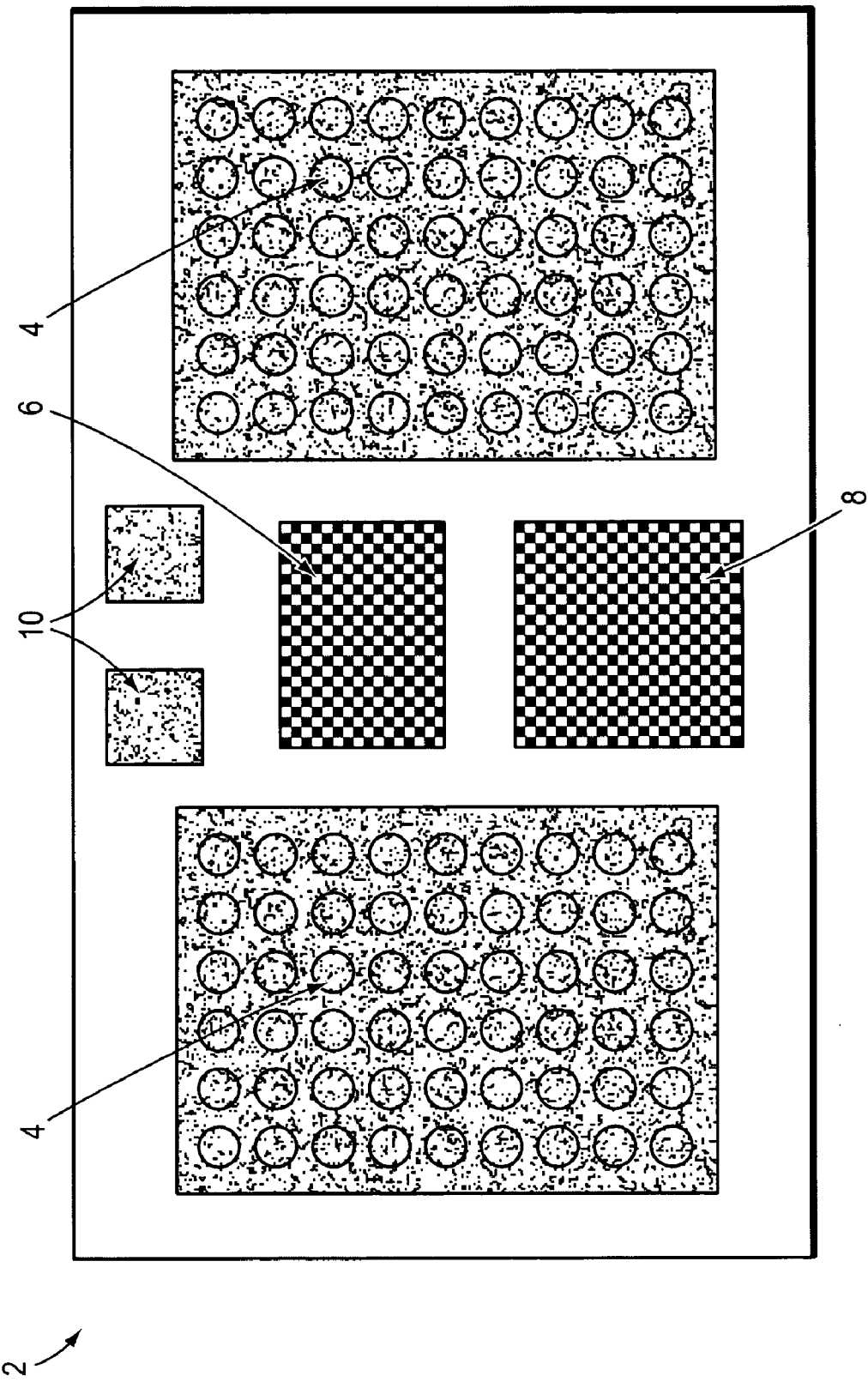
FIG. 1 is block diagram view of a preferred embodiment of the present invention.

FIG. 1 shows a block diagram view of a single integrated circuit chip 2 with integrated fuel cell arrays 4 with power converting 6, power conditioning and regulating 8 circuitry, and power transistors 10 on the same die or chip 2, as compared to packaging such functions separately.

The fuel cell arrays 4 are made via known MEMS techniques where MOSFET power switches 10, or insulated gate bipolar transistors (IGBT) switches 10, and power conversion 6 control circuitry 8, e.g. switching mode type circuitry (SMPS), are built into the same integrated circuit as the fuel cells.

Figure 2A:
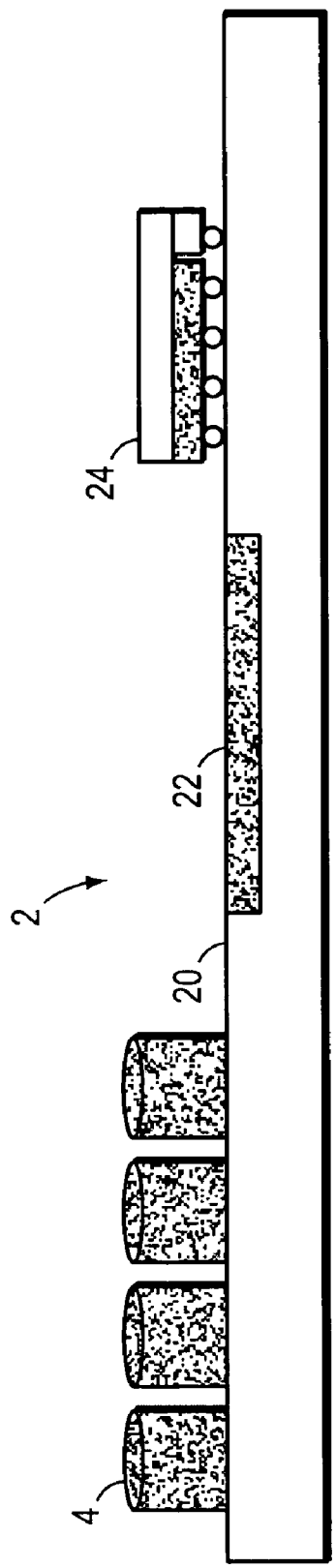
FIGS. 2A and 2B are cross section views of chips made in accordance with the present invention.

FIG. 2A shows, in cross section, the fuel cells 4, the controller functions 6 and 8 for the switching power supply and conditioning circuitry. The assembly of FIG. 2A shows the contact area for power integrated circuitry on the top side 20 of the chip, the "top" side is defined above. In this instance, the connections between the fuel cell array 4 and circuit components integrated 22 are made by etched runs or grown layers within the chip. An integrated or even discrete circuit 24 may be mounted to the base chip 2. The item 24 might contain the conversion, regulation and control circuitry 6 and 8 (FIG. 1) while the power transistors 10 (FIG. 1) may be formed in the integrated area 22. In another embodiment, not shown, the conversion, regulating and control circuitry may also be formed within an integrated area on the chip.

Figure 2B:
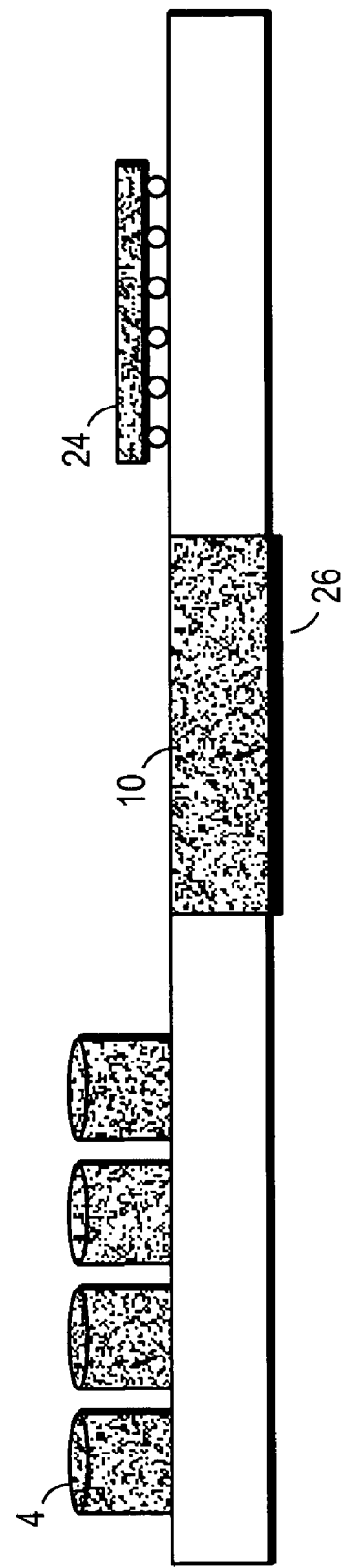

FIG. 2B shows another embodiment of the invention where the power transistors 10 are built onto the integrated circuit, but where the power transistors extend through the chip to the underside or substrate side 26. In this case, with the contact area for power circuitry on the bottom side 22, a much larger area is available to support higher current densities and power dissipation.

The integration techniques that allow the above preferred embodiments include: monolithic integration of MOS and bipolar components, multiple chips mounted onto the same chip or crier (chip on chip), and discrete mounted components in a more conventional hybrid approach. These individual assemblies and construction are well known in the art, but in each of the above preferred embodiments of the present invention there is no discrete wiring required to incorporate these assemblies and constructions into the preferred embodiments. Prior art systems incorporating such assemblies and constructions make the electrical connections with discrete wires.

Figure 3:
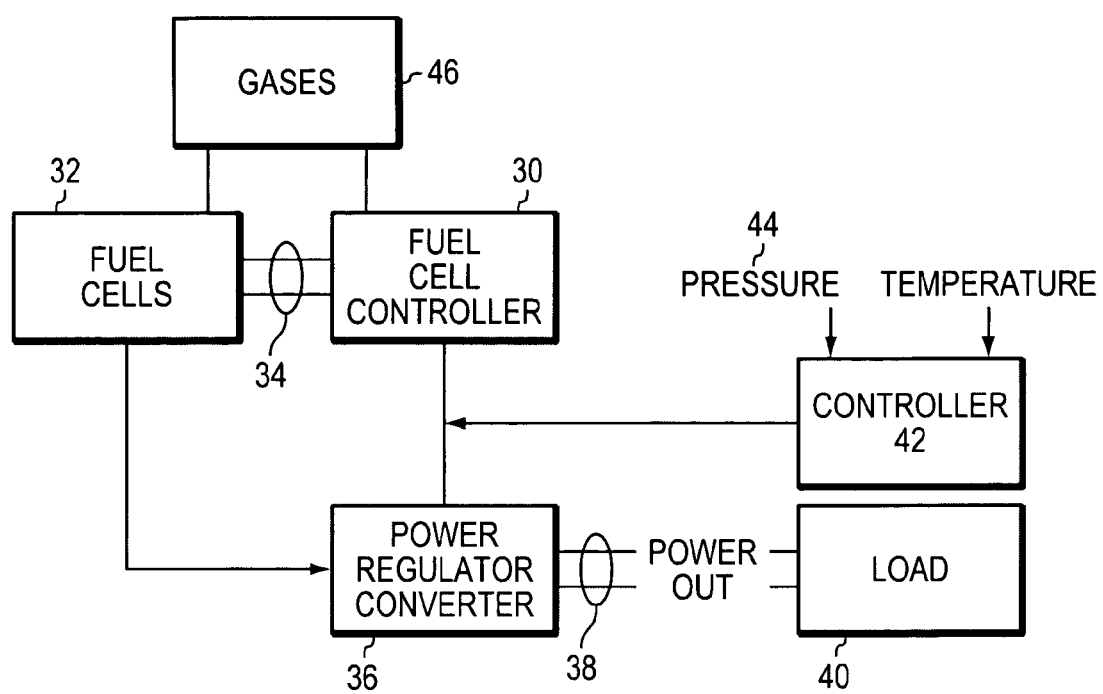
FIG. 3 is a function block diagram of an embodiment of the invention.

FIG. 3 shows the operational functions in an embodiment of the present invention. A controller 30 inputs the fuel cell 32 output power leads 34 directly and provides a switching power regulator 36 that outputs regulated power 38 to a system load 40. The output voltage of the regulator may be any of the typically used voltages used in the art, e.g. 1.8, 2.5, 3.8. and/or 5.0 volts. But, virtually any output voltage may be used including bipolar voltages (negative). The switching circuitry may be that as found in typical applications well known in the art. The system can also monitor load conditions and feed this information back to the fuel cell embedded controller function 42 in the form of digital signals through a suitable data bus, as known in the art. This embedded fuel cell controller, as taught by Marsh in U.S. Pat. No. 6,312,846, monitors gas pressure and temperature 44 and can output signals to control flow rate of the fuel cell gases 46 to accommodate different power needs in different applications. The temperature and pressure are used by the control portion of the power system to optimize the system performance. System performance profiles of the fuel cell operation, as is known in the art, may be generated to accommodate the response of the system to the temperature and pressure measurement. Building such fuel cells and controllers are now well known in the art, and the Marsh patent is incorporated herein by reference, as it illustrates the building of a MEMS fuel cell and controller.

The feedback data path between the load sensing elements in the power conditioning circuitry (associated with a switching mode power circuitry, SMPS) and the fuel cell controller allows a system closed loop feedback approach which is consistent with existing power supply load matching capabilities. The load sensing element may be a current mirror MOS transistor pair with one in the current line to the load and the mirror in the controller. The mirror transistor may be constructed (via channel width/length) as known in the art to provide a mirror equal to the load current or a mirror that is smaller or larger.

The start up of the IC controller and the power conditioning circuitry may use a bootstrap start up approach by tapping off a little of the fuel cell power for stand by and idle power applications with the load monitoring function. The load monitoring may also serve as a trigger that communicates to the fuel cell controller when the power demand is increasing to bring the supply up to full power when and as needed.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. An integrated power system constructed on a single chip, the integrated power system comprising:
    at least one fuel cell built on the chip defining channels for gases to flow and outputting a voltage signal,
    means for accepting fuel cell gases into the channels,
    a power convener that accepts the voltage signal from the fuel cell and converts that voltage into a second output voltage suitable for use in electronic systems,
    a fuel cell controller that regulates the gases flowing into and/or through the at least one fuel cell, wherein the gas flow corresponds to a power output of the at least one fuel cell,
    means for detecting the power delivered via the second output voltage and providing a feedback signal corresponding thereto, and
    means for connecting the signal to the fuel cell controller, wherein the fuel cell controller is responsive to the feedback signal to meet the power delivered.

2. The integrated power system of claim 1 further comprising means for measuring the temperature and pressure of the flowing gases and for communicating the measurements to the integrated power system.

3. The integrated power system of claim 1 wherein the integrated power system defines two sides of the chip, the first side being where monolithic structures are built and interconnected and a second side of the chip defining the substrate, and further where the power converter comprises power transistors that deliver current via the second output voltage.

4. The integrated power system of claim 3 wherein the power transistors are integrated into the chip and connections thereto are made on the first side of the chip.

5. The integrated power system of claim 3 wherein the power transistors are integrated into the chip and connections thereto are made on both the first and the second sides of the chip.

6. The integrated power system of claim 1 wherein at least part of the power converter, the fuel cell controller are constructed on at least one assembly defining first contact points, and wherein the chip defines contact points constructed to make electrical contact with the first contact points, such that the at least one assembly can be mounted onto the chip and electrical connections made between the chip and the at least one assembly.

7. The integrated power system of claim 1 wherein the power converting functions comprises a switching mode type circuitry.

\* \* \* \* \*